Sept. 12, 1933.  J. E. JOHNSON ET AL  1,926,590
SWITCH MECHANISM FOR VEHICLE SIGNALING DEVICES
Filed Oct. 29, 1928  2 Sheets-Sheet 1
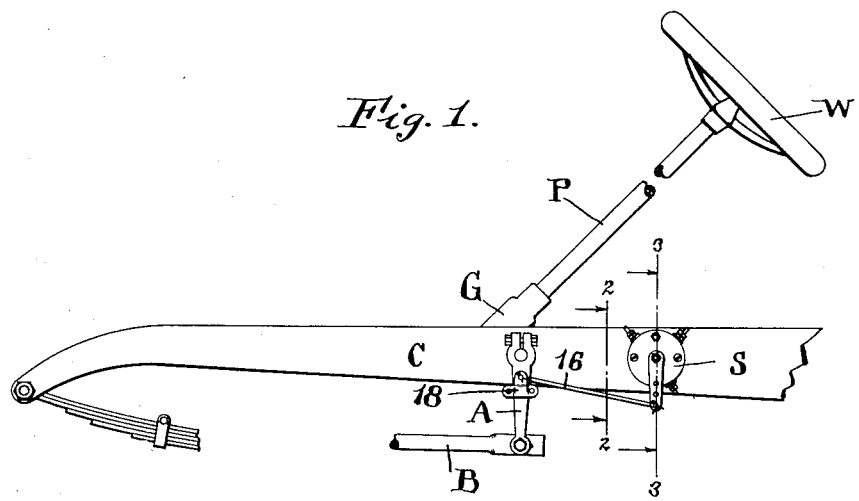
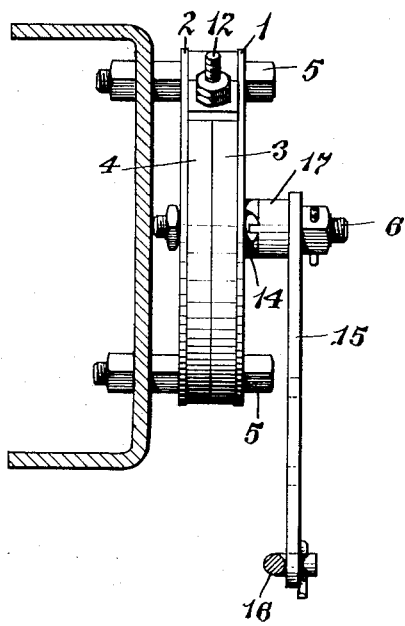
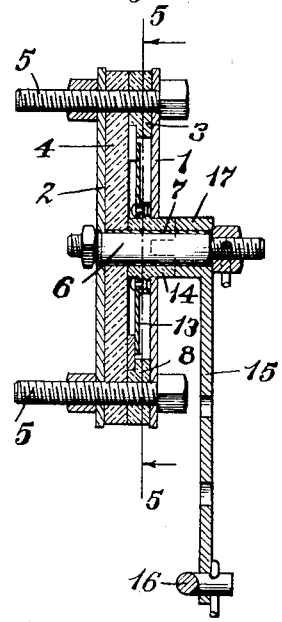
Inventors
James E. Johnson
Robert J. Jackson
By Popp and Powers
Attorney Sept. 12, 1933.  J. E. JOHNSON ET AL  1,926,590
SWITCH MECHANISM FOR VEHICLE SIGNALING DEVICES
Filed Oct. 29, 1928   2 Sheets-Sheet 2
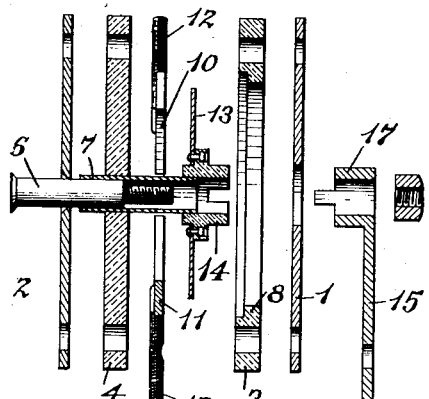
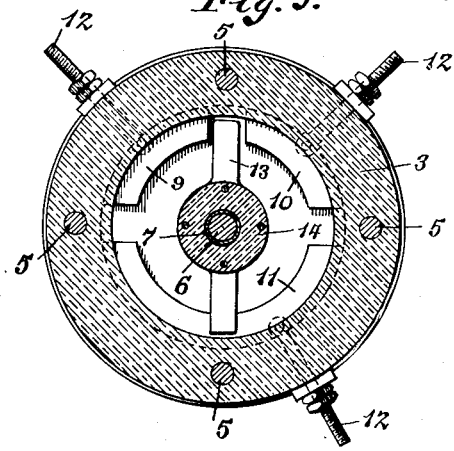
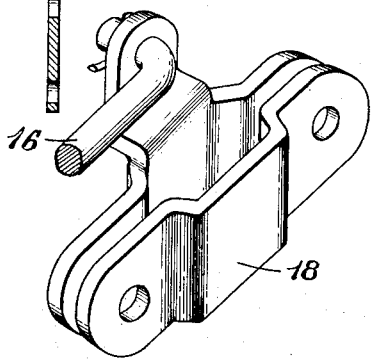
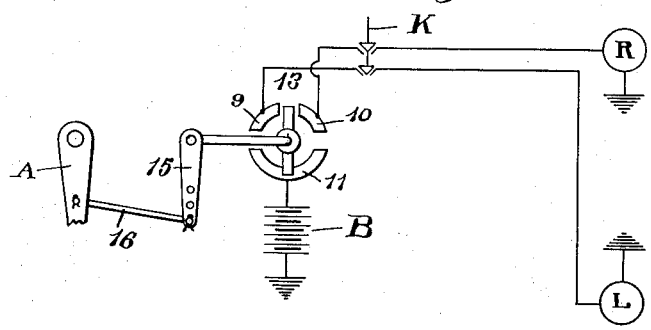
Inventors
James E. Johnson
Robert J. Jackson
By Popp and Powers
Attorney Patented Sept. 12, 1933

1,926,590

UNITED STATES PATENT OFFICE 1,926,590

SWITCH MECHANISM FOR VEHICLE SIGNALING DEVICES

James E. Johnson and Robert J. Jackson, Buffalo, N. Y.

Application October 29, 1928. Serial No. 315,687

1 Claim. (Cl. 200—59)

This invention relates to vehicle signaling devices of the kind involving a set of indicators for indicating the left and right turning movements of the vehicle and a switch mechanism for effecting the ordered operation of the indicators upon a turning movement of the vehicle.

The invention is particularly adapted for use on automobiles and has for an object to provide a switch mechanism which, without alteration, can be easily and securely attached to the chassis of any of the existing types of automobiles now in common use, at a point where it will not interfere with the operation of the automobile and where it will be substantially concealed from view while remaining readily accessible for purposes of inspection, adjustment or removal.

Another object is to provide a switch mechanism which will be automatically and positively actuated by a turning element of the vehicle at the beginning of the turning movement and which, when so actuated, will automatically effect an ordered and continuous operation of the indicators during the turning movement and an interruption thereof at the end of such movement.

A further object is to provide a switch mechanism of simple and compact construction involving a minimum of moving parts, which can be inexpensively manufactured and easily assembled and in which the working parts are fully protected against dirt.

An embodiment of the invention is illustrated in the accompanying drawings, wherein:

Figure 1 is a view in elevation showing the switch mechanism as applied to the chassis of an automobile and connected to the steering arm of the steering mechanism.

Figure 2 is a view along line 2—2 of Figure 1.

Figure 3 is a section along line 3—3 of Figure 1.

Figure 4 is an assembly view in section similar to Figure 3, the central pinion bolt and surrounding bushing being broken off to show the construction and arrangement of the parts more clearly.

Figure 5 is a section along line 5—5 of Figure 3.

Figure 6 is a perspective of the clip which is secured to the steering arm and to which the switch mechanism connecting link is secured.

Figure 7 is a schematic diagram of the circuits associated with the switch mechanism.

The switch mechanism may be applied to any suitable type of automobile and is illustrated at S in Figure 1 in connection with general details of an automobile of a well known type, such details including the chassis frame C and steering mechanism comprising the steering wheel W, post P, gear G, arm A and steering rod or drag link B all of which are arranged in the conventional manner. In the operation of the automobile, the manipulation of the wheel W to effect a left turn, for example, causes the arm A to swing in one direction away from its vertical position while a right turn movement of the wheel causes a reverse movement of the arm A. The switch mechanism S, as shown and preferred, is secured to the chassis at a point permitting its convenient connection to the arm A but it should be understood that it may be located at any other suitable point and connected to any suitable turning element if desired.

The switch mechanism S includes an outer pair of face plates 1 and 2 preferably composed of metal and an inner pair of insulating plates 3 and 4 preferably composed of fiber, these plates being secured together by suitably spaced bolt-nut assemblies 5. The bolts and nut assemblies 5 also provide a convenient means of securing the switch mechanism to the chassis but it may, of course, be otherwise secured. Both pairs of plates are formed with a central aperture through which a pinion bolt 6 and surrounding bushing 7 extend. The central aperture in the fiber plate 3 is enlarged as at 8 (Fig. 4) to provide a compartment or space in which the contact elements of the switch are located.

The contact elements of the switch include three suitably spaced stationary arcuate contact members 9, 10 and 11 respectively which are preferably arranged in the form of a circle along the margin of the central compartments the contact member 11 which is adapted to be connected to a source of electric energy providing a power terminal. These members are held in position by contact posts 12 which are secured thereto and extend radially outward through suitable radial recesses in the fiber plate 4. The members 9, 10 and 11 cooperate with a diametrically arranged contact member 13 having a fiber hub 14 by which it is mounted on the central bushing 7 for relative angular movement. The member 13 is adapted to connect electrically the arcuate contact members 9 and 11 during a left turning movement, for example, and the members 10 and 11 during a right turning movement. When the car is moving on a straight-a-way the member 13 maintains its contact with the common contact member 11 but extends between and out of contact with the members 9 and 10, the spacing of the members 9 and 10 being sufficient to prevent any contact with the member 13 due to the movement of the latter from the incidental wobble of the steering mechanism to which it is connected.

The switch mechanism, as stated, is preferably operated by the steering arm A and to this end the diametrical contact member 13 is connected to the arm A by an intervening lever 15 and connecting link 16. The lever 15 is provided with a fiber hub 17 and mounted for angular movement upon the bushing 7, the hub 17 preferably being connected to the hub 14 (of member 13) by a tongue and groove connection. The lever 15 is held on the bushing 7 through a nut threaded on the pinion bolt 6.

The connecting link 16 passes through an aperture in the outer end of the lever 15 and is secured therein in any suitable manner, it being noted that the lever 15 is formed with several apertures for purposes of adjustment. The opposite end of the link 16 is similarly secured to a clip 18 which, in turn, is securely fastened to the arm A.

The circuit arrangement of the switch mechanism S is illustrated in Figure 7 wherein right and left turn indicators are shown at R and L respectively. These indicators are, of course, preferably placed at the rear of the car in any suitable manner and another pair of similar indicators may, if desired, be placed at the front thereof. Each indicator has one side connected to the arcuate contact member 11 through a ground connection. The other side of each indicator is connected through the ignition switch to the arcuate contact members 9 and 10 respectively. The battery B is preferably interposed between the ground connection and the contact member 11.

In operation, when the ignition switch K is off, the indicator circuits are open and no signal is possible. When the ignition switch is turned on and the car started, the indicator circuits remain open so long as the front wheels of the car are not turned. The indicator circuits also remain open if the wheels wobble inasmuch as the spacing of the stationary contact members 9 and 10 from the movable contact member 13 is sufficient to prevent the closing of either circuit from the resultant movement of the latter. At the beginning of a right turn, for example, the resultant movement of the steering arm A is sufficient to establish contact between the members 9 and 11 through the movement of the member 13 thereby closing the circuit of the indicator R. This circuit is held closed continuously throughout the turning movement regardless of the degree of the turn due to the use of an arcuate contact 9 which permits the member 13 to move over the permissible range without breaking its contact with the member 9. At the end of the turning movement when the wheels are straightened out, the member 13 is returned to the off or neutral position and the circuit broken. A left turn effects a similar operation of the indicator L through the contact members 10, 11 and 13.

A feature of the construction is its simplicity. The switch mechanism has but few parts which are readily assembled into a complete unit and easily attached to any car regardless of its construction. The contact elements are enclosed and fully protected against the access of dirt to which the switch is subject due to its position. The movable contact member is positively connected to the turning element and hence positively actuated in either direction and its operation is not made to depend upon springs or other parts which are readily subject to derangement. The operation of the device is automatically controlled and does not require any attention from the driver of the car.

Having fully described our invention, we claim:

A switch mechanism for automatically controlling the right and left signaling means of an automobile comprising an insulating plate, a pair of spaced arcuate contacts mounted on one face of said plate in relative arcuate alignment, a contact post connected to and extending outwardly from each arcuate contact, a member extending transversely through said plate at a point located on the inner side of the arcuate contacts, a contact arm mounted for relative angular movement about said transverse member, said arm normally extending between and out of engagement with said arcuate contacts but being adapted for engagement with one contact throughout a range of angular movement on one side of its normal position and with the other contact throughout a range of angular movement on the other side of its normal position, a second insulating plate secured to said first plate and formed with a recess to provide a clearance for said contact members and a lever mounted exteriorly of said plates for angular movement about said transverse member, said lever being connected to said contact arm whereby angular movement of said lever effects a similar movement of said arm, the contact members being adapted for electrical connection in the circuits of the right and left signaling means and the lever for connection to a turning element of the steering mechanism by which it is operated.

JAMES E. JOHNSON.
ROBERT J. JACKSON.